2 Sheets—Sheet 1.

W. R. HAVENS.

Assignor to THE ECLIPSE WIND ENGINE COMPANY.

FRICTION CLUTCH.

No. 10,926. Reissued May 1, 1888.

Witnesses.
W. C. Collier.
T. S. E. Dyer.

Inventor
William R. Havens.
By Hill & Dixon.
Attys.

N. PETERS. Photo-Lithographer, Washington, D. C.

W. R. HAVENS.

Assignor to THE ECLIPSE WIND ENGINE COMPANY.

FRICTION CLUTCH.

No. 10,926. Reissued May 1, 1888.

Witnesses.
W. C. Coulics.
J. S. E. Dixon.

Inventor.
William R. Havens.
By Hill & Dixon.
Atty's

N. PETERS, Photo-Lithographer, Washington, D. C.

UNITED STATES PATENT OFFICE.

WILLIAM R. HAVENS, OF DENVER, COLORADO, ASSIGNOR TO THE ECLIPSE WIND ENGINE COMPANY, OF BELOIT, WISCONSIN.

FRICTION-CLUTCH.

SPECIFICATION forming part of Reissued Letters Patent No. 10,926, dated May 1, 1888.

Original No. 220,613, dated October 14, 1879. Application for reissue filed November 8, 1887. Serial No. 254,660.

*To all whom it may concern:*

Be it known that I, WILLIAM R. HAVENS, of Denver, in the county of Arapahoe and State of Colorado, have invented certain new and useful Improvements in Friction-Clutches; and I do hereby declare the following to be a full, clear, and exact description thereof, reference being had to the accompanying drawings, making a part of this specification, and in which—

Figure 1:
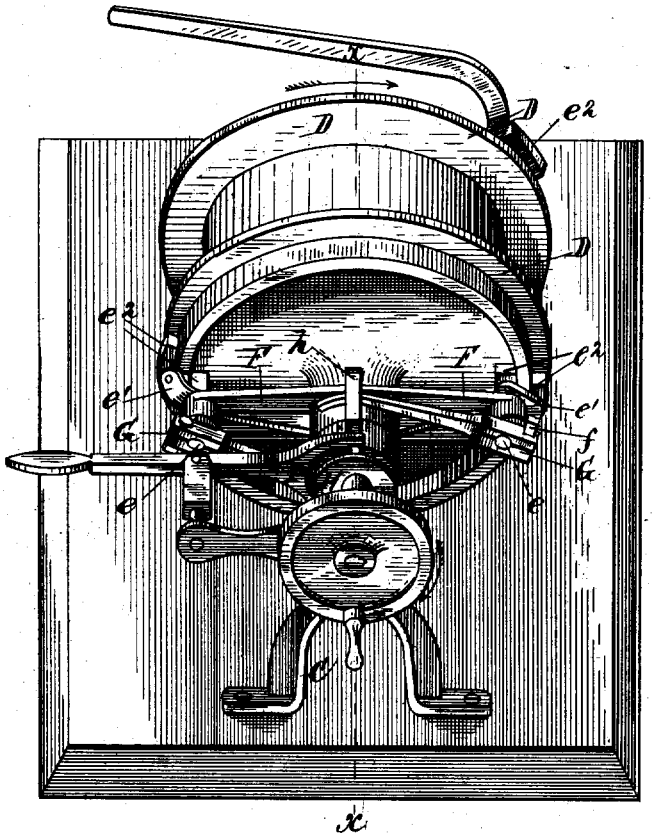
Figure 2:
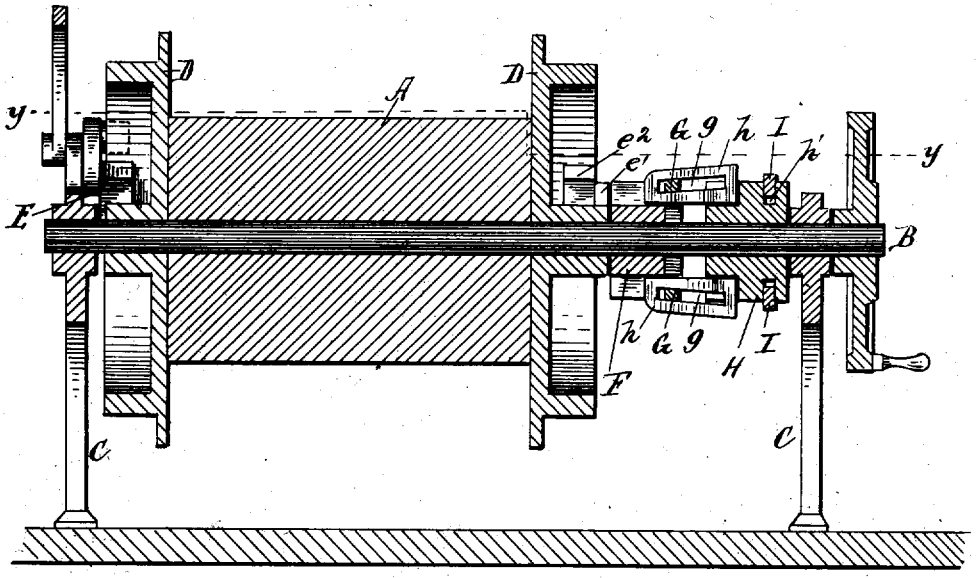
Figure 3:
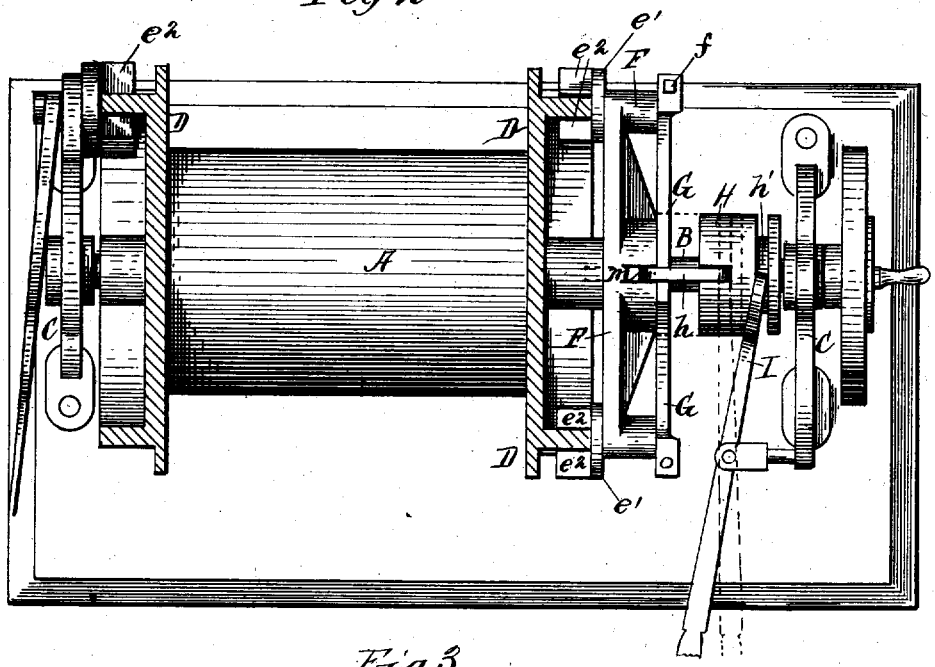

Figure 1 is a perspective view. Fig. 2 is a vertical central longitudinal section. Fig. 3 is a plan view.

This invention relates to certain new and useful improvements in the class of friction-clutches that are adapted to engage with an annular rim secured to a cylinder, wheel, or other body to be moved; and the invention consists, essentially, in a novel construction of clutch mechanism, whereby the friction is simultaneously applied to the outside and inside of the annular rim, all as will be hereinafter fully described and claimed.

To enable others skilled in the art to make and use my invention, I will proceed to describe the exact manner in which I have carried it out.

In the drawings, A represents a spool loosely mounted on a shaft, B. At one end of the spool A is mounted an arm or bar, F, having transverse holes through the same near its ends, and through which pass the journal-rods *e e*. These journal-rods *e e* have rigidly secured to their inner ends, facing the spool, metallic plates *e′ e′*, arranged diagonally to the bar F, so that the brake-shoes $e^2$ $e^2$, secured by pivoting to the opposite ends of the plates *e′ e′*, will come on the opposite sides of the annular rim or ring D.

To the outer ends of the journal-rods *e e* are secured the outer ends of the levers G G, the inner ends of said levers passing through the elongated slots *g g* in the brackets *h h*, secured to a ring, H, loosely mounted on the shaft B, said ring being provided with an annular groove, *h′*, for the reception of a clutch-lever, I, pivoted to the short arm of a right-angled bar projecting horizontally from one of the supports or standards C.

The slots in the brackets incline outward from their inner toward their outer ends, so that in sliding the ring H toward the spool the inner ends of the levers G G will be thrown outward or away from the shaft, which movement oscillates the journal-rods *e e* sufficiently to cause the shoes $e^2$ $e^2$ to engage with the inner and outer sides of the rim or ring D, a reverse movement of the ring H drawing the inner ends of the lever G toward the shaft B, thus releasing or throwing the shoes $e^2$ $e^2$ out of engagement with said rim or ring.

The ring H is prevented from turning on the shaft B by means of the brackets working in transverse grooves *m m* in the bar F.

Having thus described my invention, I claim as new and desire to secure by Letters Patent—

1. In a friction-clutch, the combination of a plate provided with shoes pivoted thereto, an arm rigidly attached to the main shaft and upon which said plate is journaled, and a lever or other equivalent means adapted to oscillate said plate and shoes, the latter being adapted to engage with the outer and inner sides of an annular rim secured to the body to be moved, substantially as described.

2. In a friction-clutch, the combination of the plate *e′*, provided with the shoes $e^2$ $e^2$, and secured to the rod *e*, journaled in the end of the arm F, in combination with the lever G, and sliding ring H, provided with the diagonally-slotted bracket *h*, substantially as and for the purpose shown and described.

WM. R. HAVENS.

Witnesses:
C. D. SNYDER,
ROBT. TODD.